United States Patent Office.

JOHN MICHELL, OF WEST FARMS, NEW YORK.

Letters Patent No. 63,921, dated April 16, 1867.

IMPROVED MATTING FOR FLOOR COVERING.

The Schedule referred to in these Letters Patent and making part of the same.

TO ALL WHOM IT MAY CONCERN:

Be it known that I, JOHN MICHELL, of West Farms, in the county of Westchester, and State of New York, have invented a new and useful improvement in Matting; and I do hereby declare that the following is a full, clear, and exact description thereof, which will enable others skilled in the art to make and use the same.

My invention has for its object to furnish a cheap and serviceable matting to take the place of cocoa and other mattings, and the coarser varieties of carpeting; and it consists of an improved matting formed by the combination of woollen, jute, and manilla with each other, whether woven plain or twilled, as hereinafter more fully described.

The warp of the matting is formed of jute and woollen. The woollen threads are colored, so as to form stripes in the matting, and the said woollen threads may, if desired, be alternated with colored threads of jute. The main body of the jute warp is colored in imitation of cocoa matting. The filling or woof of the matting is formed of manilla grass, the fibres of which overlap each other, and are wound spirally with a thread, so as to form a continuous thread for convenience in weaving. The matting may be woven plain or twilled, as may be desired. The matting thus made forms a neat, flexible, and serviceable article, and can be manufactured at a comparatively small expense. If desired, the manilla woof may be replaced by Russian grass, prepared by being wound spirally with a thread, as before described. This latter material beds better than the manilla, and thus enables me to form a closer and softer matting than when the manilla is used.

Having thus described my invention, I claim as new, and desire to secure by Letters Patent—

An improved matting, formed by the combination of woollen, jute, and manilla or Russian grass with each other, whether woven plain or twilled, substantially as herein described, as a new article of manufacture.

The above specification of my invention signed by me this 19th day of December, 1866.

JOHN MICHELL.

Witnesses:
WM. F. MCNAMARA,
JAMES T. GRAHAM.